Patented Mar. 4, 1941

2,234,006

UNITED STATES PATENT OFFICE 2,234,006

REFRACTORY

John Charles McMullen, Niagara Falls, N. Y., assignor to The Carborundum Company, Niagara Falls, N. Y., a corporation of Delaware No Drawing. Application July 5, 1938,
Serial No. 217,588

7 Claims. (Cl. 106—9)

This invention relates to the manufacture of refractory bodies for use in furnace linings, and the like where the bodies are subjected to high temperatures and corrosive slags and atmospheres, and especially to compositions suitable for use under basic or neutral operating conditions. It also is concerned with cast refractory bodies made from such compositions, that is, bodies and shapes formed by melting the raw ingredients, pouring the molten mixture into molds of the desired shape and annealing.

The basic refractories heretofore made up in bonded form have not been found to be of sufficient resistance to the corrosive slags and atmospheres present in steel furnaces and similar basic-operating furnaces to permit their use at higher temperatures desired for most efficient operation. Attempts to utilize the cast type of refractories, which are free from bonding material and are substantially impermeable, in contact with basic slags and atmospheres have encountered numerous difficulties.

Pure magnesium oxide, for example, which is widely acknowledged to be one of the most resistant of basic materials, has so far defied all efforts to melt and pour it into cast shapes due to its extremely high melting point. In attempts to find some other material of a basic or neutral nature which might be used, attention has also been given to calcium oxide and chromite, two other well-known refractory materials.

Calcium oxide, by itself, likewise is difficult to melt and pour and has the further undesirable characteristic of slaking badly, even when admixed with considerable amounts of other basic materials.

While the use of chromite in various compositions has met with moderate success it has the disadvantage that practically all chromite ores contain substantial amounts of acid oxides such as silica and titania, which lower their resistance to basic influences.

One object of this invention is to provide a new series of basic refractory compositions made up largely of magnesia and calcium oxide which, when desired, can be readily cast into blocks and shapes of the desired form and which are highly resistant to attack by basic slags and atmospheres.

It is a further object of the invention to provide highly basic compositions which, although containing substantial amounts of calcium oxide, when calcined or fused and cast into shapes, do not undergo slaking later to any harmful degree. Still another object is to provide basic refractories that possess an improved resistance to heat shock.

In my co-pending application Serial No. 177,229, filed November 30, 1937, I have disclosed basic refractory compositions containing largely magnesia and calcium oxide and which are resistant to basic conditions. As disclosed therein, it is possible to obtain castable basic refractory bodies which are non-slaking and fairly resistant to basic slags by the addition of alumina and/or iron oxide to such compositions within the amounts set forth.

While such compositions are moderately resist to heat shock, I have discovered that their resistance to heat shock is further decidedly improved, while at the same time practically all of their other desirable qualities are unimpaired and even improved by the addition of bone ash, or some other compound containing phosphoric oxide.

I have found the following mixes to be particularly good in basic refractory use and to show pronounced improvement over other common basic refractories. These will serve as specific examples of compositions made in accordance with my invention, although I do not wish to limit my invention to these specific compositions.

(1)

|  | Per cent |
|---|---|
| Magnesia | 55 |
| Bone ash | 25 |
| Alumina | 20 |

(2)

|  | Per cent |
|---|---|
| Magnesia | 17½ |
| Calcined dolomite | 68 |
| Iron oxide | 4½ |
| Bone ash | 10 |

(3)

|  | Per cent |
|---|---|
| Magnesia | 45 |
| Calcium oxide | 39 |
| Bone ash | 10 |
| Iron oxide | 5½ |

It is not essential that straight or pure oxides be used in making up the fusions but any raw materials may be proportioned to obtain the desired final composition providing they contain no considerable amounts of silica. In any of the mixes dolomite may be the source of part or all of the lime and magnesia. The bone ash used contains about 75% calcium phosphate. Chemical analysis of the bone ash used in the specific mixes given above is:

| | Per cent |
|---|---|
| CaO | 55.62 |
| $P_2O_5$ | 36.02 |
| MgO | 1.74 |
| $SiO_2$ | .78 |
| Alkalies | .64 |
| Loss on ignition | .22 |

While the specific compositions given have been found to be particularly good, I have discovered that all refractory bodies composed of magnesia, lime, bone ash or other phosphoric oxide-containing compounds, alumina and/or iron within the following limits show material superiority over other basic refractories:

| | Per cent |
|---|---|
| Oxide of Ca and/or Mg | 50-80 |
| Oxide of Al and/or Fe | 3-35 |
| $P_2O_5$ | 3-15 |

It should be noted however, that when iron oxide is used, its fluxing action is more severe than that of alumina so that the percentage of iron oxide should in general be kept in the lower half of the above range whereas the alumina may well be in the upper half.

In selecting raw materials for making up the mixes I have found it essential for best results to choose and proportion my materials so as to introduce into the final raw mixture less than 5% of silica as an impurity. The presence of silica in any appreciable amount tends to lower the resistance to slag attack and increases the tendency to spall and slake.

The usual process of making cast refractory articles comprises mixing the raw ingredients in the proper proportions to form a batch and melting the batch in an open top pot furnace to form a molten bath of the material. The fusing step is carried out by means of a pair of carbon electrodes lowered into the bath with current flowing from one electrode to the other through the material as a resistance. To start the fusing operation, a path of granular carbon or a temporary carbon bar is placed in the mix along its top surface between the two electrodes to carry the current until a molten bath has been formed, linking the two electrodes. Additional mix is fed into the furnace from the top until a sufficient bath is obtained. The material is then poured into molds by tilting the furnace. After the mold contents have solidified to the extent necessary for handling, the mold is removed and the cast article slowly cooled either by annealing in a furnace or placing in an insulating medium for retaining its heat. The casting process here briefly outlined is described in detail in United States Patent No. 2,063,154 of which I am co-inventor.

It might be expected that bone ash would act as a flux and so lower the melting range as to be detrimental, but this is not the case. In fact, basic refractory compositions of the kind and in the proportions herein disclosed and containing bone ash, possess a refractoriness of no practical difference from that of those compositions in which it is absent. The improved spalling resistance is accomplished without departing from the high standards desired in respect to other properties.

To determine the serviceability of articles made in accordance with this invention, I have subjected them to various tests and have found them to be extremely resistant to corrosive basic slags and atmospheres and to have a much lower tendency to spall and slake than any other cast refractories which I have tested. The addition of bone ash appears particularly beneficial in increasing the spalling resistance of the resulting refractories. Besides possessing the desirable qualities of slag resistance, refractoriness and spall resistance, the above compositions undergo practically no slaking action in moist atmospheres, in spite of their large content of calcium oxide in the fused state.

Having described my invention fully, I do not wish to be limited to the specific mixes hereinabove disclosed, but desire protection to the extent of the appended claims.

I claim:

1. As a refractory material, a fused mass consisting essentially of magnesia, lime, alumina, iron oxide and phosphoric oxide.

2. As a new article of manufacture, a basic fused cast refractory article consisting essentially of magnesia, lime, iron oxide, alumina and phosphoric oxide.

3. A magnesia-lime basic fused refractory article containing 3 to 15% iron oxide and 3 to 15% phosphoric oxide.

4. A magnesia-lime basic fused refractory article containing 10 to 35% alumina and 3 to 15% phosphoric oxide.

5. A magnesia-lime basic fused refractory body containing from 3 to 35% of the oxides of iron and aluminum and 3 to 15% phosphoric oxide.

6. A fused cast refractory article composed of 20 to 60% magnesia, 20 to 60% calcium oxide, 3 to 15% iron oxide and 3 to 15% phosphoric oxide.

7. A fused cast refractory article composed of 50 to 75% magnesia, 10 to 35% alumina and 3 to 15% phosphoric oxide.

JOHN CHARLES McMULLEN.